US010802338B2

(12) United States Patent
Yamada

(10) Patent No.: US 10,802,338 B2
(45) Date of Patent: Oct. 13, 2020

(54) LIGHT FLUX CONTROL MEMBER, LIGHT EMITTING DEVICE, AND A SURFACE LIGHT SOURCE DEVICE

(71) Applicant: Enplas Corporation, Saitama (JP)

(72) Inventor: Kyouhei Yamada, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 16/495,996

(22) PCT Filed: Mar. 20, 2018

(86) PCT No.: PCT/JP2018/011134
§ 371 (c)(1),
(2) Date: Sep. 20, 2019

(87) PCT Pub. No.: WO2018/174076
PCT Pub. Date: Sep. 27, 2018

(65) Prior Publication Data
US 2020/0050057 A1    Feb. 13, 2020

(30) Foreign Application Priority Data

Mar. 21, 2017 (JP) ................................. 2017-054625

(51) Int. Cl.
*G02F 1/13357* (2006.01)
*G09G 3/34* (2006.01)
(Continued)

(52) U.S. Cl.
CPC .. *G02F 1/133603* (2013.01); *G02F 1/133605* (2013.01); *G09G 3/3406* (2013.01);
(Continued)

(58) Field of Classification Search
CPC ........ G02F 1/133603; G02F 1/133605; G09G 3/3406; G09G 3/342; G09G 3/3413; F21V 5/04; F21V 5/046; F21V 5/08
See application file for complete search history.

(56) References Cited

U.S. PATENT DOCUMENTS

2009/0296388 A1* 12/2009 Wu ...................... G02B 6/0018
362/235
2012/0154263 A1* 6/2012 Imajo ................ G02F 1/133603
345/102
(Continued)

FOREIGN PATENT DOCUMENTS

JP    2012-128296 A    7/2012

OTHER PUBLICATIONS

International Search Report from International Application No. PCT/JP2018/011134 dated May 29, 2018.

*Primary Examiner* — Zheng Song
(74) *Attorney, Agent, or Firm* — Brundidge & Stanger, P.C.

(57) ABSTRACT

A light flux control member has: a rear surface extending in the Y-axis direction; and a first incident plane, a second incident plane, and a third incident plane disposed on the rear surface side, said third incident plane reflecting light incident to the first incident plane. The light flux control member further has: a first reflecting plane disposed on the front side and reflecting, to one direction in the Y-axis direction, light incident to the first incident plane, light incident to the first incident plane and reflected on the third incident plane, and light incident to the third incident plane; and a second reflecting plane for reflecting light incident to the second incident plane to the other direction in the Y-axis direction. The light flux control member still further has two
(Continued)

exit planes disposed sandwiching the first reflecting plane and the second reflecting plane and facing each other.

5 Claims, 13 Drawing Sheets

(51) Int. Cl.
*F21V 5/08* (2006.01)
*F21V 5/04* (2006.01)

(52) U.S. Cl.
CPC ............... *F21V 5/04* (2013.01); *F21V 5/046* (2013.01); *F21V 5/08* (2013.01); *G02F 2001/133607* (2013.01); *G09G 3/342* (2013.01); *G09G 3/3413* (2013.01); *G09G 3/3426* (2013.01)

(56) References Cited

U.S. PATENT DOCUMENTS

| | | | |
|---|---|---|---|
| 2015/0369454 A1* | 12/2015 | Lee | G02F 1/133605 |
| | | | 362/97.1 |
| 2016/0025297 A1* | 1/2016 | Liu | G02B 19/0028 |
| | | | 362/97.1 |
| 2017/0059122 A1* | 3/2017 | Chiu | F21V 5/046 |
| 2018/0087751 A1* | 3/2018 | Jung | G02B 19/0066 |

* cited by examiner

LIGHT FLUX CONTROL MEMBER, LIGHT EMITTING DEVICE, AND A SURFACE LIGHT SOURCE DEVICE

TECHNICAL FIELD

The present invention relates to a light flux controlling member, a light emitting device and a surface light source device.

BACKGROUND ART

Some transmission type image display apparatuses such as liquid crystal display apparatuses use a direct surface light source device as a backlight. In recent years, direct surface light source devices having a plurality of light emitting elements as the light source have been used.

For example, a direct surface light source device includes a substrate, a plurality of light emitting elements, a plurality of light flux controlling members (lenses) and a light diffusion member. The light emitting element is a light-emitting diode (LED) such as a white light-emitting diode, for example. The plurality of light emitting elements are disposed in a matrix on a substrate (e.g., a plurality of lines each of which includes a plurality of light emitting elements are disposed). The light flux controlling member that expands the light of the light emitting element in the plane direction of the substrate is disposed over each light emitting element. The light emitted from the light flux controlling member is diffused by the light diffusion member so as to illuminate an illumination member (e.g., a liquid crystal panel) in a planar fashion.

In recent years, to manufacture large surface light source devices at low cost, it is desired to reduce the number of light-emitting elements (e.g., it is desired to reduce the number of lines of a plurality of light-emitting elements). Specifically, it is desired to deliver light to the corners of the surface light source device while reducing the number of the lines of a plurality of light-emitting elements.

For example, PTL 1 discloses backlight unit 4 (surface light source device) including substrate 42, a plurality of LED modules (light-emitting elements) 41, a plurality of lenses 45 (light flux controlling members), and a plurality of optical sheets (not illustrated in the drawing) as illustrated in FIG. 1 and FIG. 2. LED modules (light-emitting elements) 41 and lenses 45 (light flux controlling members) are disposed in a line at the center of backlight unit 4. In addition, as illustrated in FIG. 2, lens 45 (light flux controlling member) includes light emission surface 45a configured to emit light emitted from LED module 41 to outside, and a pair of side surfaces 45b disposed with light emission surface 45a therebetween. With such a configuration, light is less expanded in the short direction (the opposing direction of the pair of side surfaces 45b) of lens 45, whereas light is readily expanded in the longitudinal direction (the direction in which light emission surface 45a extends).

CITATION LIST

Patent Literature

PTL 1
Japanese Patent Application Laid-Open No. 2012-128296

SUMMARY OF INVENTION

Technical Problem

In recent years, for example, with the increase in the variety of the external shape of surface light source devices, it is desired to dispose a line of a plurality of light-emitting elements at a position shifted from the center of the surface light source device in some situation. In this case, however, to deliver light to the corners of the surface light source device, it is desired that lens 45 asymmetrically expand (or distribute in biased directions) the light emitted from the light-emitting element with respect to the light axis of the light-emitting element in the longitudinal direction of lens 45 (the extending direction of light emission surface 45a).

However, lens 45 disclosed in PTL 1 expands the light emitted from a plurality of light-emitting elements such that the light expands symmetrically about the optical axes of the light-emitting elements in the longitudinal direction of lens 45 (the extending direction of light emission surface 45a). Consequently, in the case where the line of a plurality of light-emitting elements is disposed at a position shifted from the center of the surface light source device, the light may not be sufficiently delivered to the corners of the surface light source device.

In view of this, an object of the present invention is to provide a light flux controlling member capable of expanding the light emitted from the light-emitting element such that the light is expanded asymmetrically with respect to the light axis of the light-emitting element in the longitudinal direction of the light flux controlling member. In addition, another object of the present invention is to provide a light-emitting device and a surface light source device including the light flux controlling member.

Solution to Problem

A light flux controlling member according to an embodiment of the present invention is configured to control a distribution of light emitted from a light-emitting element, the light flux controlling member including: a rear surface that is parallel to an XY plane and extends in a Y-axis direction in XYZ coordinates including an X axis, a Y axis and a Z axis orthogonal to each other; a first incidence surface that is a part of an inner surface of a recess disposed on a side of the rear surface, the first incidence surface being configured to allow incidence of a part of the light emitted from the light-emitting element; a second incidence surface that is another part of the inner surface of the recess, the second incidence surface being configured to allow incidence of another part of the light emitted from the light-emitting element; a third incidence surface disposed between the first incidence surface and the second incidence surface, the third incidence surface being configured to allow incidence of still another part of the light emitted from the light-emitting element while reflecting light entered from the first incidence surface; a first reflection surface disposed on a front side that is opposite to the rear surface in a Z-axis direction, the first reflection surface being configured to reflect, to a first side in the Y-axis direction, the light entered from the first incidence surface, light that is entered from the first incidence surface and is reflected by the third incidence surface, and light that is entered from the third incidence surface; a second reflection surface disposed on the front side, the second reflection surface being configured to reflect light entered from the second incidence surface to a second side in the Y-axis direction, the second side being opposite to the first side; and two emission surfaces disposed opposite each other with the first reflection surface and the second reflection surface between the two emission surfaces, the two emission surfaces being configured to emit, to outside, light reflected by the first reflection surface or the second reflection surface.

A light-emitting device according to an embodiment of the present invention includes: a light-emitting element whose light axis is disposed parallel to the Z axis; and the light flux controlling member. The first incidence surface and the second incidence surface are disposed opposite the light-emitting element.

A surface light source device according to an embodiment of the present invention includes: a plurality of the light-emitting devices; and a light diffusion plate configured to allow light emitted from the plurality of the light-emitting devices to pass through the light diffusion plate while diffusing the light.

Advantageous Effects of Invention

According to the present invention, it is possible to provide a light flux controlling member capable of expanding the light emitted from the light-emitting element such that the light is expanded asymmetrically with respect to the light axis of the light-emitting element in the longitudinal direction of the light flux controlling member.

DESCRIPTION OF EMBODIMENTS

Figure 1:
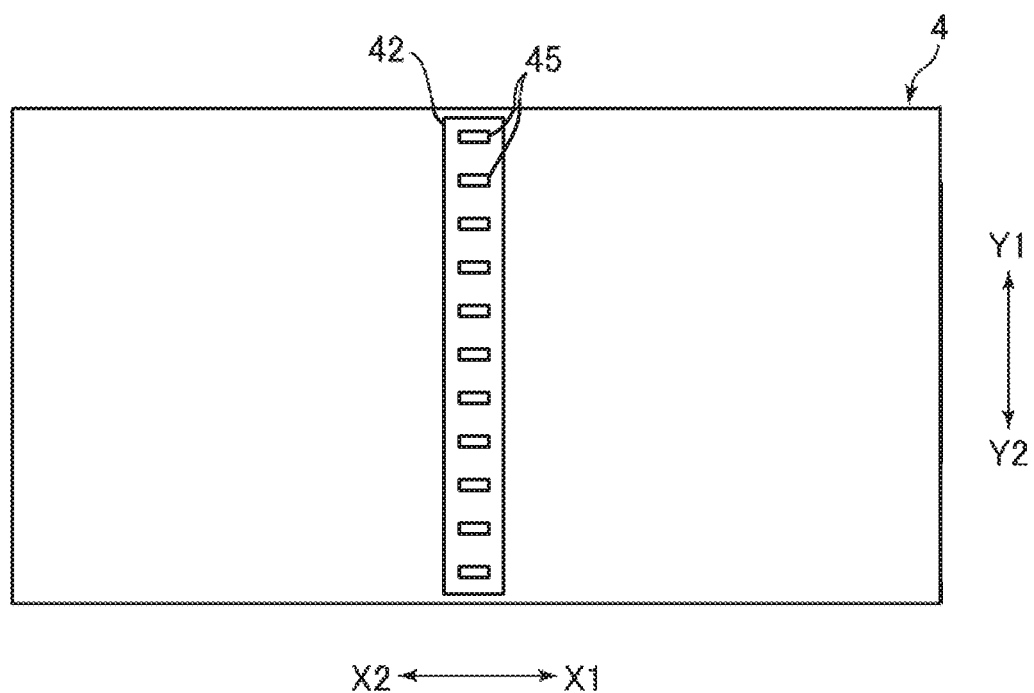
FIG. 1 illustrates a configuration of a conventional surface light source device.
Figure 2:
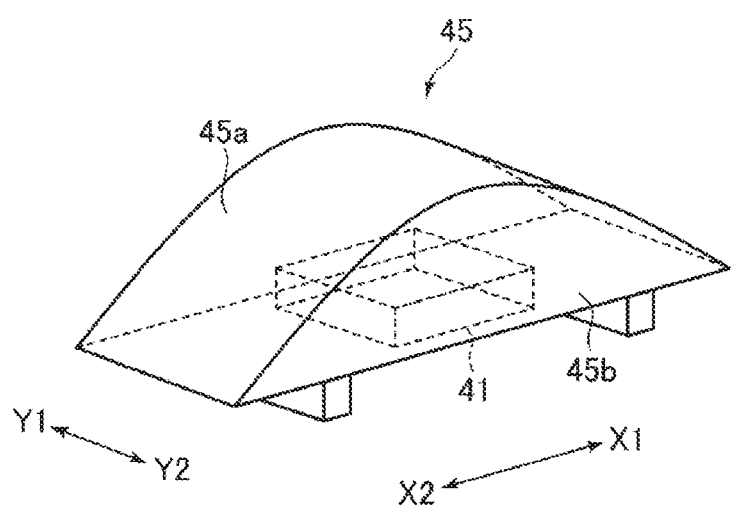
FIG. 2 illustrates a configuration of a conventional light flux controlling member.
Figure 3A:
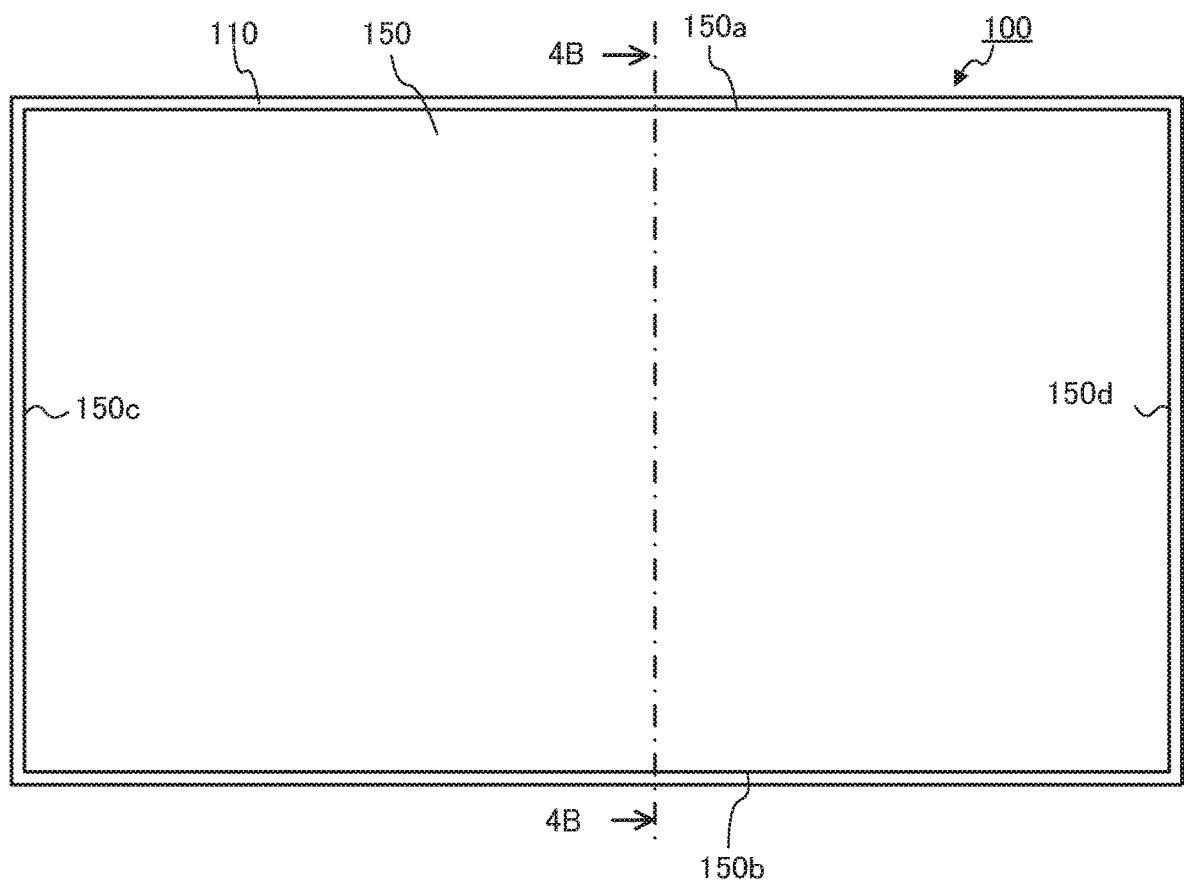
FIGS. 3A and 3B illustrate a configuration of a surface light source device according to an embodiment.
Figure 3B:
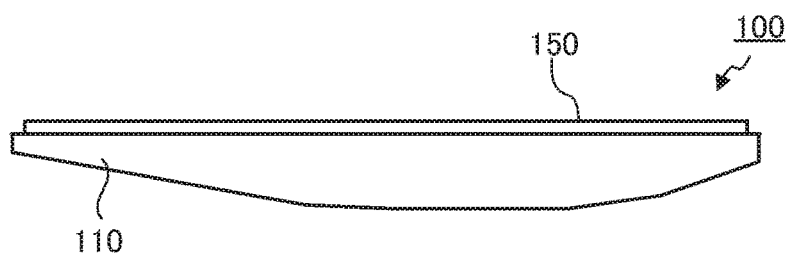
Figure 4A:
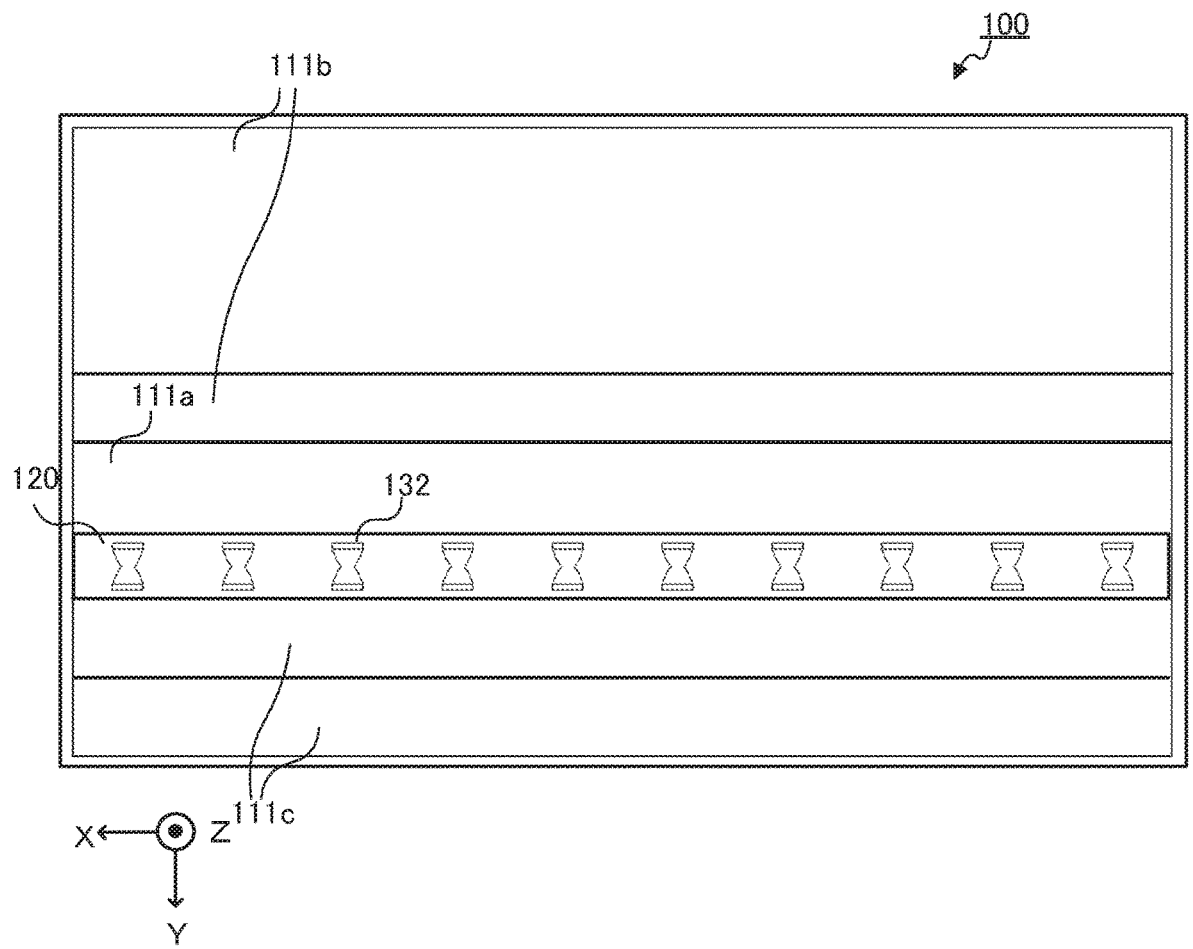
FIGS. 4A and 4B illustrate a configuration of the surface light source device according to the embodiment.
Figure 4B:
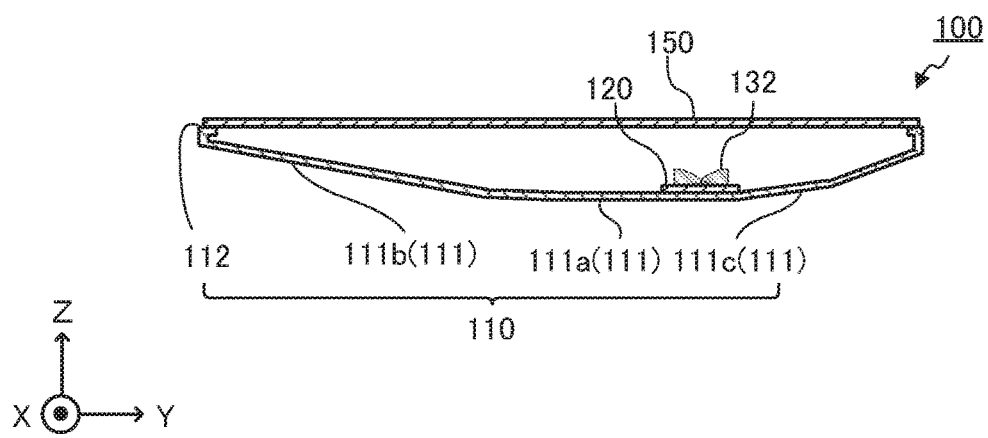
Figure 5:
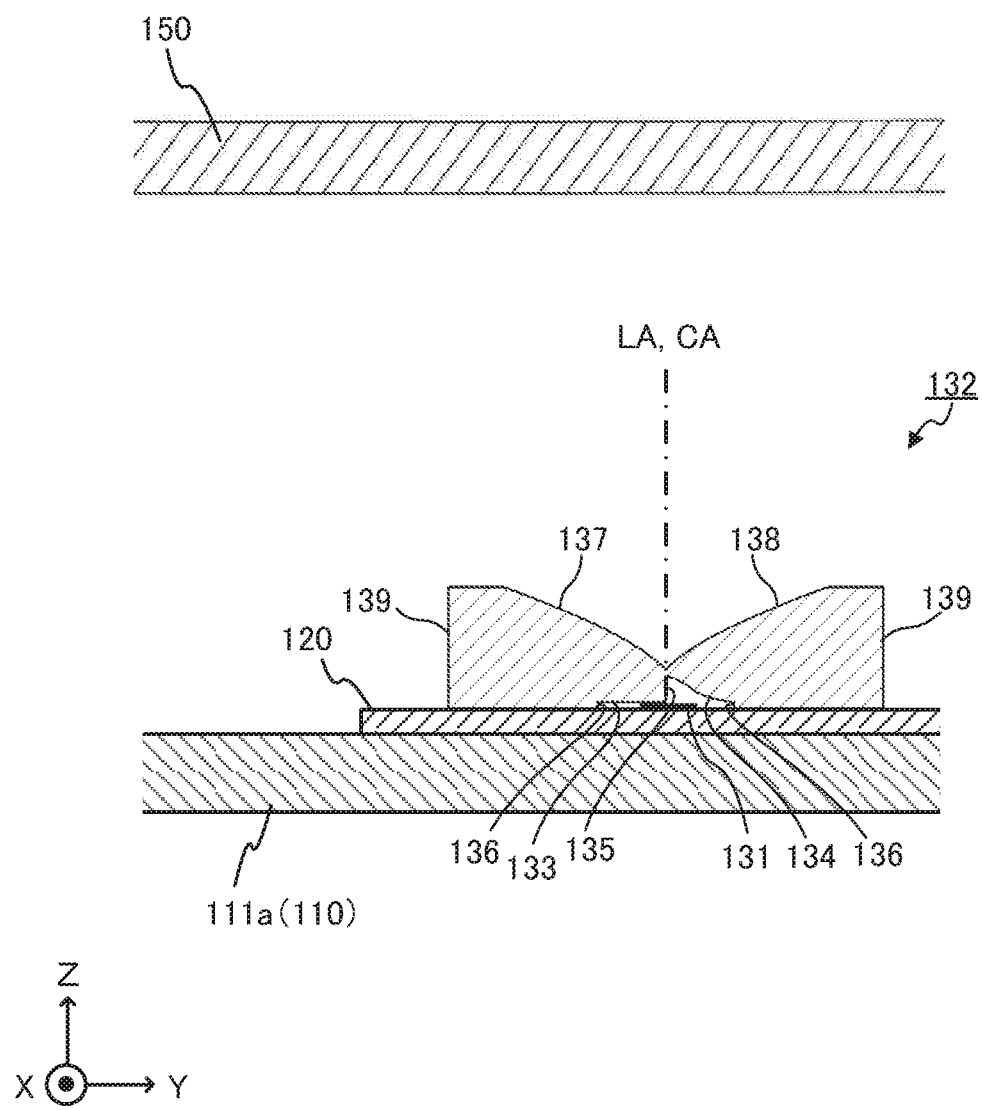
FIG. 5 is a partially enlarged sectional view of FIG. 4B.

An embodiment of the present invention is elaborated below with reference to the accompanying drawings.
Configuration of Surface Light Source Device FIGS. 3A to 4B illustrate a configuration of surface light source device 100 according to the present embodiment. FIG. 3A is a plan view of surface light source device 100 and FIG. 3B is a left side view of surface light source device 100. FIG. 4A is a plan view of a state where light diffusion plate 150 is removed in FIG. 3A and FIG. 4B is a sectional view taken along line 4B-4B of FIG. 3A. FIG. 5 is a partially enlarged sectional view of FIG. 4B.

As illustrated in FIGS. 3A to 4B, surface light source device 100 includes housing 110, substrate 120, a plurality of light-emitting devices 130 and light diffusion plate 150.

Housing 110 is a box for housing substrate 120 and a plurality of light emitting devices 130 therein. At least a part of one surface of housing 110 is open. Housing 110 is composed of bottom plate 111, and top plate 112 disposed opposite bottom plate 111. Bottom plate 111 includes horizontal part 111a parallel to top plate 112, and inclined parts 111b and 111c. Inclined parts 111b and 111c are disposed with horizontal part 111a therebetween, and are inclined toward top plate 112 (with one or more steps). Inclined parts 111b and 111c can reflect, toward light diffusion plate 150, light approximately horizontally emitted from light-emitting device 130 such that the light emitted from light-emitting device 130 can be readily collected at light diffusion plate 150. In addition, inclined parts 111b and 111c are different from each other in the inclination angle to horizontal part 111a and/or the length between horizontal part 111a and top plate 112, i.e., inclined parts 111b and 111c are asymmetrical to each other (see FIG. 4B). With housing 110 having the above-mentioned shape, the external thickness of surface light source device 100 can be reduced. In top plate 112, an opening of a rectangular shape that serves as a light emission region is formed. The size of the opening corresponds to the size of the light emission region formed in light diffusion plate 150, and is, for example, 400 mm×700 mm (32 inch). This opening is closed with light diffusion plate 150. The height (space thickness) from the surface of bottom plate 111a to light diffusion plate 150 is, but not limited to, about 10 to 40 mm. Housing 110 is composed of a resin such as polymethylmethacrylate (PMMA) and polycarbonate (PC), a metal such as stainless steel and aluminum, or the like, for example.

Substrate 120 is a flat plate disposed on bottom plate 111 of housing 110 and is configured to dispose a plurality of light emitting devices 130 at a predetermined interval in housing 110. The surface of substrate 120 is configured to reflect, toward light diffusion plate 150, light arriving from light emitting device 130.

Light-emitting devices 130 are disposed in a line on substrate 120 at positions shifted from the center of bottom plate 111 in plan view of surface light source device 100. To be more specific, in plan view of surface light source device 100, the line of light-emitting devices 1 is substantially parallel to a pair of opposite sides (in FIG. 3A a pair of opposite long sides 150a and 150b) of light diffusion plate 150 such that the distance from one side (in FIG. 3A, long side 150a) of the pair of opposite sides of light diffusion plate 150 is greater than that of the other side (in FIG. 3A, long side 150b) of the pair of opposite sides of light diffusion plate 150.

The number of light emitting devices 130 disposed on substrate 120 is not limited. The number of light emitting devices 130 disposed on substrate 120 is appropriately set based on the size of the light emission region (light emitting surface) defined by the opening of housing 110.

Each light emitting device 130 includes light emitting element 131 and light flux controlling member 132. Each light emitting device 130 is disposed such that the light axis of light emitted from light emitting element 131 (light axis LA of light emitting element 131 described later) is aligned with the normal to the surface of substrate 120. In addition, light-emitting devices 130 are disposed such that first incidence surface 133 described later of light flux controlling member 132 is closer to one side (in FIG. 3A, long side 150a) of the pair of opposite sides of light diffusion plate 150 than second incidence surface 134 described later.

Light emitting element 131 is the light source of surface light source device 100 (and light emitting device 130). Light emitting element 131 is disposed on substrate 120. Light emitting element 131 is a light-emitting diode (LED), for example. The color of light emitted from light emitting element 131 included in emitting device 130 is not limited.

Light flux controlling member 132 controls the distribution of light emitted from light-emitting element 131 so as to change the travelling direction of the light to substantially opposite directions substantially perpendicular to light axis LA of light-emitting element 131 (directions corresponding to positive-negative directions of a Y axis described later). Light flux controlling member 132 is disposed over light-emitting element 131 such that central axis CA thereof is parallel to, or more preferably aligned to, light axis LA of light-emitting element 131 (see FIG. 5). The "light axis LA of light-emitting element" means a central light beam of a stereoscopic light flux emitted from light-emitting element 131. The "central axis CA of light flux controlling member 12" is the symmetric axis of 2-fold rotational symmetry in the case where light flux controlling member 12 is 2-fold rotational symmetric except in first incidence surface 133, second incidence surface 134, third incidence surface 135 and fourth incidence surface 136, for example.

Below, in each light-emitting device 130, central axis CA of the light flux controlling member is also referred to as a Z axis, the axis that is orthogonal to the Z axis and is parallel to the arrangement direction of light-emitting devices 130 is also referred to as an X axis, and the axis orthogonal to the Z axis and the X axis is also referred to as a Y axis. That is, in the XYZ coordinates composed of the X axis, the Y axis and the Z axis orthogonal to each other, light axis LA of light-emitting element 131 is disposed such that light axis LA of light-emitting element 131 is parallel to, or more preferably aligned to, the Z axis. In the case where light axis LA of light-emitting element 131 is aligned with the Z axis, the origin of the XYZ coordinates is aligned with the light-light emission center of the emitting element, for example. A virtual plane including the X axis and the Y axis is referred to as an XY plane, a virtual plane including the Y axis and the Z axis is referred to as a YZ plane, and a virtual plane including the X axis and the Z axis is referred to as an XZ plane.

The material of light flux controlling member 132 is not limited as long as light of a desired wavelength can pass therethrough. Examples of the material of light flux controlling member 132 include: optically transparent resins such as polymethylmethacrylate (PMMA), polycarbonate (PC), and epoxy resin (EP); and glass.

A main feature of surface light source device 100 according to the present embodiment is the configuration of light flux controlling member 132. Therefore, light flux controlling member 132 will be separately described in detail.

Light diffusion plate 150 is disposed to close the opening of housing 110. In the present embodiment, light diffusion plate 150 has a rectangular shape with a pair of long sides 150a and 150b opposite each other and a pair of short sides 150c and 150d opposite each other that matches the shape of the opening of housing 110. Light diffusion plate 150 is a plate-shaped member having optical transparency and light diffusing property, and allows light emitted from emission surface 139 of light flux controlling member 132 to pass therethrough while diffusing the light. Light diffusion plate 150 can serve as a light-emitting surface of surface light source device 100, for example.

The material of light diffusion plate 150 is not limited as long as light emitted from emission surface 139 of light flux controlling member 132 can pass therethrough while being diffused. For example, light diffusion plate 150 is formed of an optically transparent resin such as polymethylmethacrylate (PMMA), polycarbonate (PC), polystyrene (PS), and styrene methyl methacrylate copolymerization resin (MS). For the purpose of providing a light diffusing property, minute irregularities are formed on the surface of light diffusion plate 150, or diffusing members such as beads are dispersed in light diffusion plate 150.

In surface light source device 100 according to the present embodiment, light emitted from each light-emitting element 131 is emitted by light flux controlling member 132 to illuminate a wide range of light diffusion plate 150 while being directed in particular to substantially opposite directions that are substantially perpendicular to light axis LA of light-emitting element 131 (in FIG. 5 Y-axis direction). Further, the light emitted from each light flux controlling member 132 is diffused by light diffusion plate 150, and is then emitted to outside.

Configuration of Light Flux Controlling Member

Figures 6A, 6B:
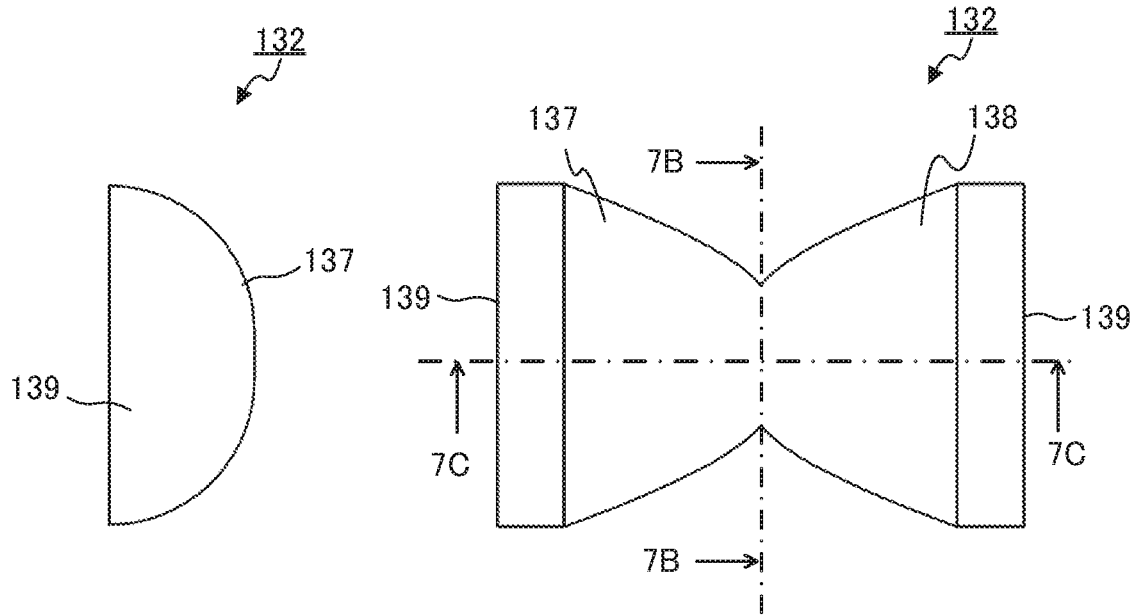
FIGS. 6A to 6C illustrate a configuration of a light flux controlling member according to the embodiment.
Figure 6C:
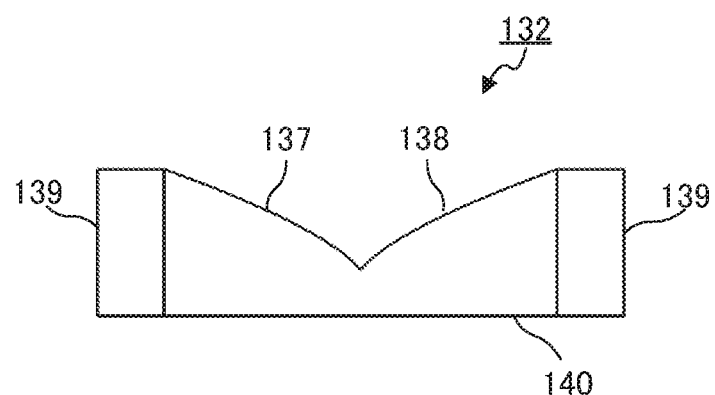
Figure 7A:
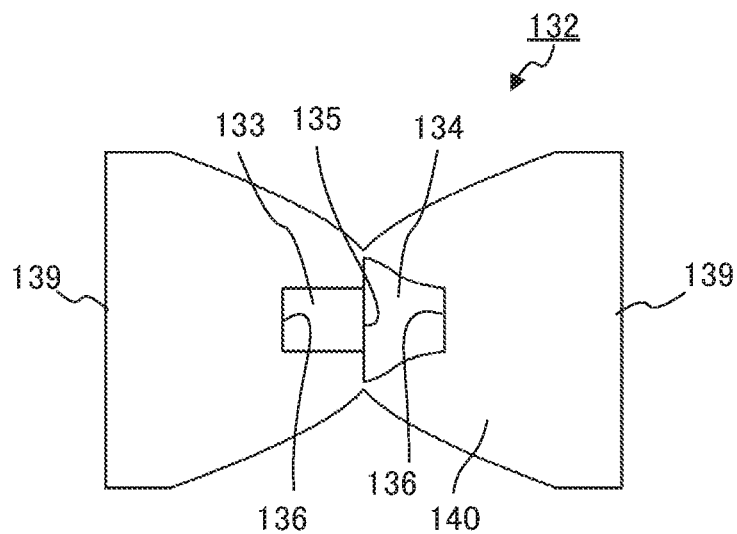
FIGS. 7A to 7C illustrate a configuration of the light flux controlling member according to the embodiment.
Figure 7B:
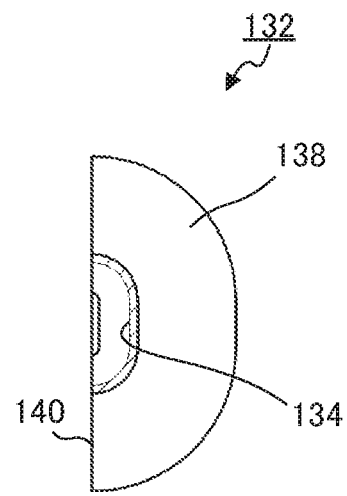
Figure 7C:
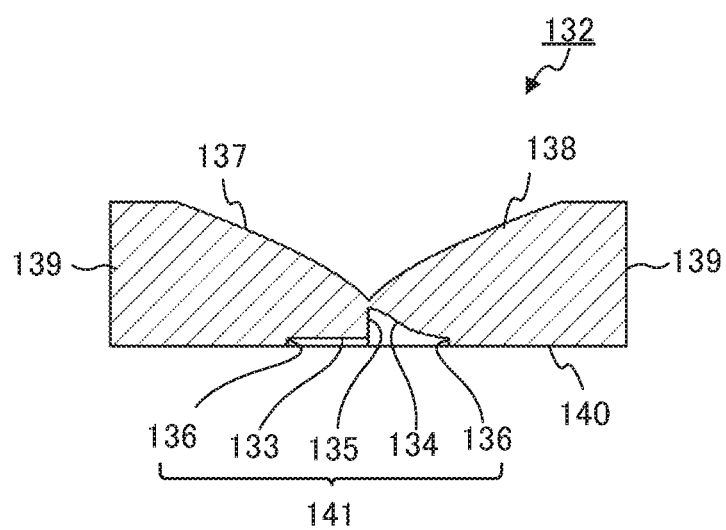

FIGS. 6A to 7C illustrate a configuration of light flux controlling member 132. FIG. 6A is a side view of light flux controlling member 132, FIG. 6B is a plan view of light flux controlling member 132, and FIG. 6C is a front view of light flux controlling member 132. FIG. 7A is a bottom view of light flux controlling member 132, FIG. 7B is a sectional view taken along line 7B-7B of FIG. 6B, and FIG. 7C is a sectional view taken along line 7C-7C of FIG. 6B.

Light flux controlling member 132 controls the distribution of light emitted from light emitting element 131. As illustrated FIGS. 6A to 6C, light flux controlling member 132 includes first incidence surface 133, second incidence surface 134, third incidence surface 135, two fourth incidence surfaces 136, first reflection surface 137, second reflection surface 138, and two emission surfaces 139.

First incidence surface 133, second incidence surface 134, third incidence surface 135 and fourth incidence surface 136 are inner surfaces of recess 141 formed at a center portion of rear surface 140 of light flux controlling member 132 (the surface on light-emitting element 131 side, i.e., the rear side). Rear surface 140 is parallel to the XY plane, and extends in the Y-axis direction.

First incidence surface 133 is preferably disposed on one side with respect to the XZ plane, and allows incidence of a part of light emitted from light-emitting element 131. First incidence surface 133 may be a planar surface or a curved surface. Preferably, first incidence surface 133 is substantially parallel to the XY plane from the viewpoint of increasing the quantity of light to be reflected by third incidence surface 135. The above-mentioned "substantially parallel to the XY plane" means that the angle between the tangent to first incidence surface 133 at any points and the XY plane is ±3° or smaller. In the present embodiment, first incidence surface 133 is a planar surface parallel to the XY plane.

Second incidence surface 134 is preferably disposed on the other side with respect to the XZ plane, and allows incidence of another part of the light emitted from light-emitting element 131. Preferably, second incidence surface 134 has a shape that readily directs light entered from the second incidence surface 134 toward second reflection surface 138.

Third incidence surface 135, which is disposed between first incidence surface 133 and second incidence surface 134, allows incidence of still another part of the light emitted from light-emitting element 131, and reflects light entered from first incidence surface 133. Third incidence surface 135 may be a planar surface, or a curved surface. Preferably, third incidence surface 135 is substantially parallel to the XZ plane from the viewpoint of increasing the quantity of the light that is entered from first incidence surface 133 and is reflected toward first reflection surface 137. The above-mentioned "substantially parallel to the XZ plane" means that the angle between the tangent to third incidence surface 135 at any points and the XZ plane is ±3° or smaller. In the present embodiment, third incidence surface 135 is a planar surface on the XZ plane.

Preferably, the maximum depth of recess 141 corresponding to first incidence surface 133 is 0.1 to 0.5 times the maximum depth of recess 141 corresponding to second incidence surface 134. When the maximum depth of recess 141 corresponding to first incidence surface 133 is equal to or smaller than 0.5 times the maximum depth of recess 141 corresponding to second incidence surface 134, third incidence surface 135 can be readily set to a predetermined size or greater, and the quantity of the light that is entered from first incidence surface 133 and is reflected by third incidence surface 135 can be readily increased, and thus, light can be asymmetrically expanded with respect to light axis LA. In the present embodiment, the maximum depth of recess 141 corresponding to first incidence surface 133 is the depth from rear surface 140 to first incidence surface 133, and the maximum depth of recess 141 corresponding to second incidence surface 134 is the depth from rear surface 140 to the vertex (the intersection of the Z axis and the second incidence surface 134) of second incidence surface 134.

Two fourth incidence surfaces 136 are disposed between first incidence surface 133 and rear surface 140, and between second incidence surface 134 and rear surface 140, respectively, and allow incidence of still another part of the light emitted from light-emitting element 131.

First reflection surface 137 is disposed on the side opposite to light-emitting element 131 (on light diffusion plate 150 side, i.e., the front side) with first incidence surface 133 therebetween. First reflection surface 137 reflects, to one direction along the Y-axis, the light entered from first incidence surface 133 and the light that is entered from first incidence surface 133 and is reflected by third incidence surface 135, and the light entered from third incidence surface 135.

Second reflection surface 138 is disposed on the side (the front side) opposite to light-emitting element 131 with second incidence surface 134 therebetween. Second reflection surface 138 reflects the light entered from second incidence surface 134 to the other direction along the Y-axis.

Each of first reflection surface 137 and second reflection surface 138 is formed in a shape that is separated away from the Y axis as it is separated away from the Z axis. To be more specific, each of first reflection surface 137 and second reflection surface 138 is formed such that, in the cross section including the Z axis and the Y axis, the inclination of the tangent thereto gradually decreases (so as to be aligned to the Y axis) from the Z axis toward the end portion (emission surface 139).

Two emission surfaces 139 are disposed opposite each other with first reflection surface 137 and second reflection surface 138 therebetween. Two emission surfaces 139 emits, to the outside, light that is entered from first incidence surface 133, second incidence surface 134 or third incidence surface 135 and is reflected by first reflection surface 137 or second reflection surface 138, and light directly reaching thereto after being entered from fourth incidence surface 136.

An operation of light flux controlling member 132 according to the present embodiment is described below with simulation results in comparison with comparative light flux controlling member 20.

Figures 8A, 8B:
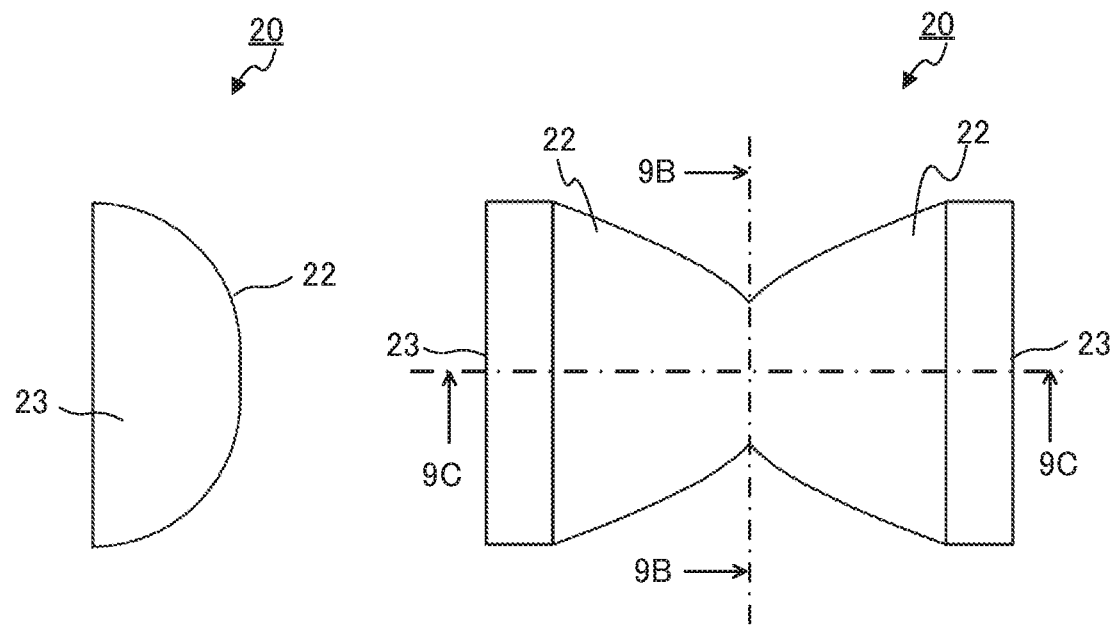
FIGS. 8A to 8C illustrate a configuration of a comparative light flux controlling member.
Figure 8C:
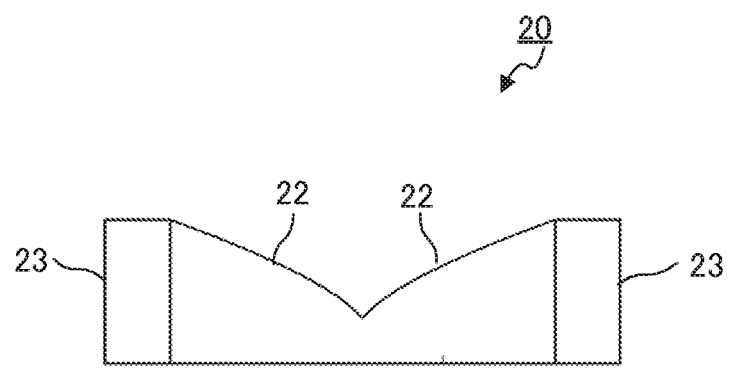
Figures 9A, 9B:
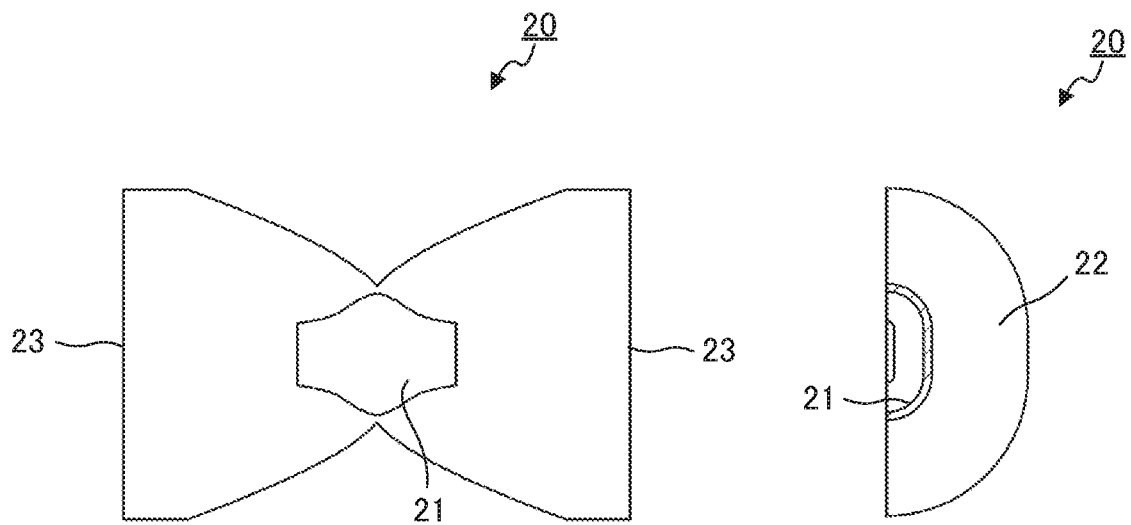
FIGS. 9A to 9C illustrate a configuration of a comparative light flux controlling member.
Figure 9C:
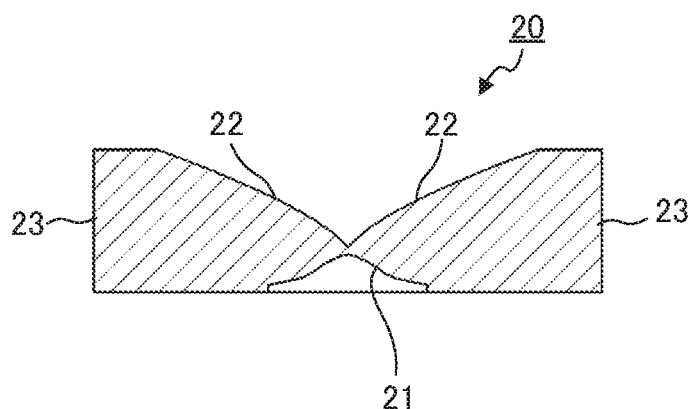

FIGS. 8A to 9C illustrate a configuration of a comparative light flux controlling member. FIG. 8A is a side view of comparative light flux controlling member 20, FIG. 8B is a plan view of comparative light flux controlling member 20, and FIG. 8C is a front view of comparative light flux controlling member 20. FIG. 9A is a bottom view of comparative light flux controlling member 20, FIG. 9B is a sectional view taken along line 9B-9B of FIG. 8B, and FIG. 9C is a sectional view taken along line 9C-9C of FIG. 8B. Comparative light flux controlling member 20 has a configuration identical to that of light flux controlling member 132 according to the present embodiment except that an incidence surface of a shape corresponding to second incidence surface 134 is provided in place of first incidence surface 133 and third incidence surface 135. That is, comparative light flux controlling member 20 is 2-fold rotational symmetric not only in reflection surface 22 and emission surface 23, but also in incidence surface 21.

Simulation

Light paths and illuminance distributions on light diffusion plate 150 were analyzed in surface light source device 100 provided with the light flux controlling member according to the present embodiment (light flux controlling member 132 illustrated in FIGS. 5 to 6C). Light paths and illuminance distributions on light diffusion plate 150 were analyzed with surface light source device 100 provided with only one light-emitting device 130.

Also, for comparison, light paths and illuminance distributions on the light diffusion plate were analyzed in a surface light source device provided with the comparative light flux controlling member (light flux controlling member 20 illustrated in FIGS. 8A to 9C).

Parameters

Figure 10A:
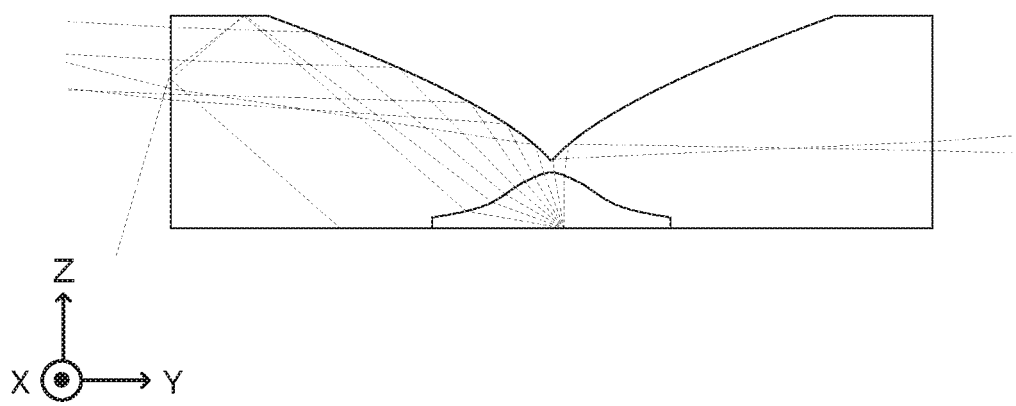
FIGS. 10A, 10B, and 10C illustrate light paths in a comparative surface light source device provided with the light flux controlling member illustrated in FIGS. 8A to 9C.
Figure 10B:
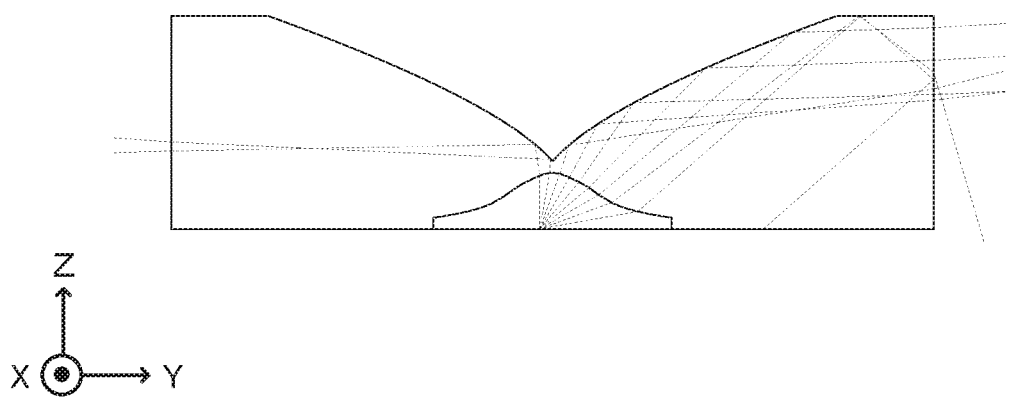
Figure 10C:
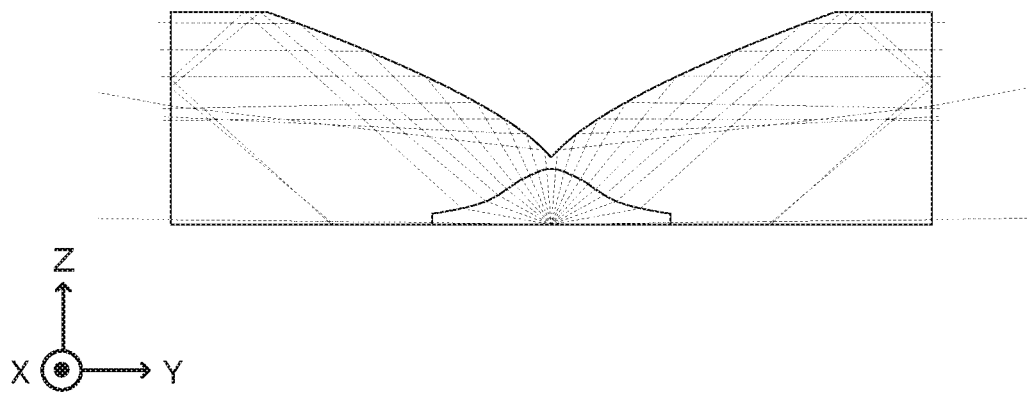

Outer diameter of light flux controlling member: 20 mm in the X axis direction, and 30 mm in the Y axis direction Maximum depth of recess 141 corresponding to first incidence surface 133: 0.4 mm Maximum depth of recess 141 corresponding to second incidence surface 134: 2.1 mm Height of light-emitting element: 0.5 mm Size of light-emitting element: φ2.6 mm Distance between substrate 120 and light diffusion plate 150: 20 mm FIGS. 10A to 10C illustrate analysis results of light paths of light entered from incidence surface 21 of light flux controlling member 20 in front view of the comparative surface light source device provided with the comparative light flux controlling member. FIG. 10A illustrates light paths of non-axial light beams emitted at respective angles differing each other by 10° in a range of 0° to −80° from a point (X=0 mm, Y=0.5 mm) in light-emitting element 131 on the positive side with respect to the light emission center in the Y-axis direction, FIG. 10B illustrates light paths of non-axial light beams emitted at respective angles differing each other by 10° in a range of 0° to 80° from a point (X=0 mm, Y=−0.5 mm) in light-emitting element 131 on the negative side with respect to the light emission center in the Y-axis direction, and FIG. 10C illustrates light paths of axial light beams emitted from the light emission center (X=0 mm, Y=0 mm) of light-emitting element 131. Note that, in FIGS. 10A to 10C, the angle of the non-axial light beam with respect to the light axis is positive on the right side and negative on the left side. The same applies to the following descriptions.

Figure 11A:
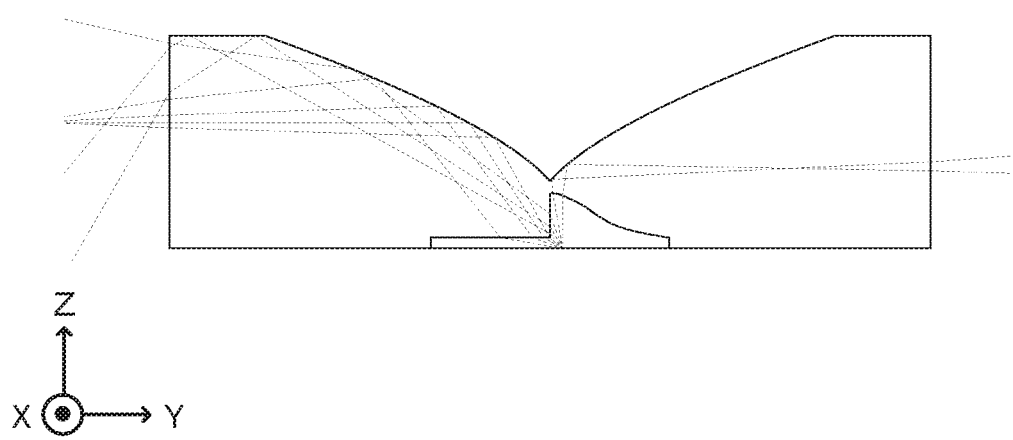
FIGS. 11A, 11B, and 11C illustrate light paths in the surface light source device according to the embodiment provided with the light flux controlling member FIGS. 6A to 7C.
Figure 11B:
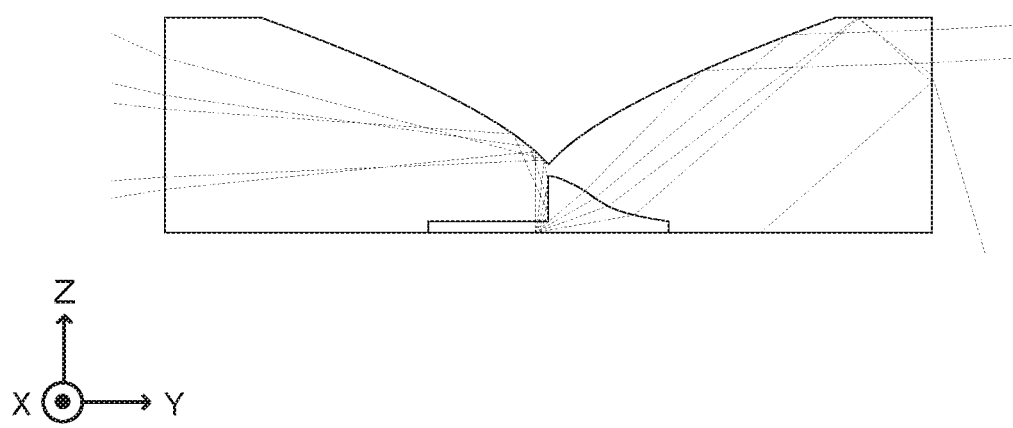
Figure 11C:
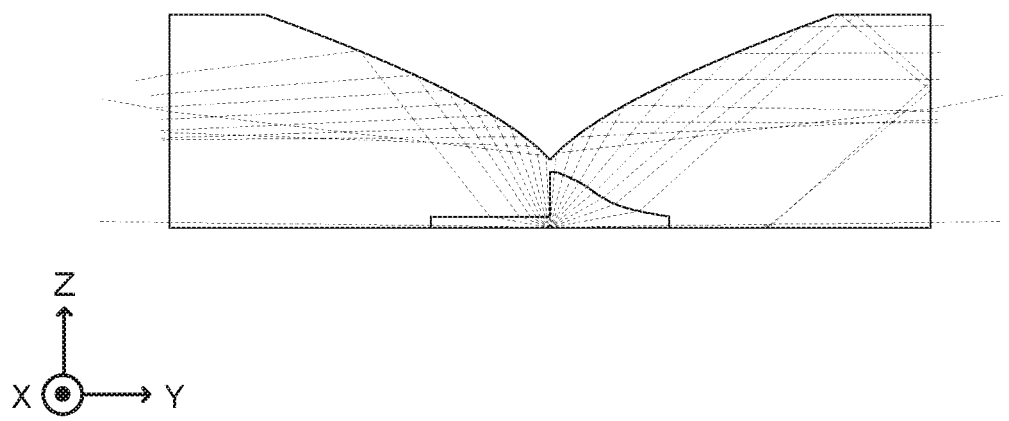

FIGS. 11A to 11C illustrate analysis results of light paths of light entered from first incidence surface 133, second incidence surface 134 and third incidence surface 135 of light flux controlling member 132 in front view of surface light source device 100 provided with the light flux controlling member according to the present embodiment.

FIG. 11A illustrates light paths of non-axial light beams emitted at respective angles differing each other by 10° in a range of 0° to −80° from a point (X=0 mm, Y=0.5 mm) in light-emitting element 131 on the positive side with respect to the light emission center in the Y-axis direction, FIG. 11B illustrates light paths of non-axial light beams emitted at respective angles differing each other by 10° in a range of 0° to 80° from a point (X=0 mm, Y=−0.5 mm) in light-emitting element 131 on the negative side with respect to the light emission center in the Y-axis direction, and FIG. 11C illustrates light paths of axial light beams emitted from the light emission center (X=0 mm, Y=0 mm) of light-emitting element 131.

Figure 12:
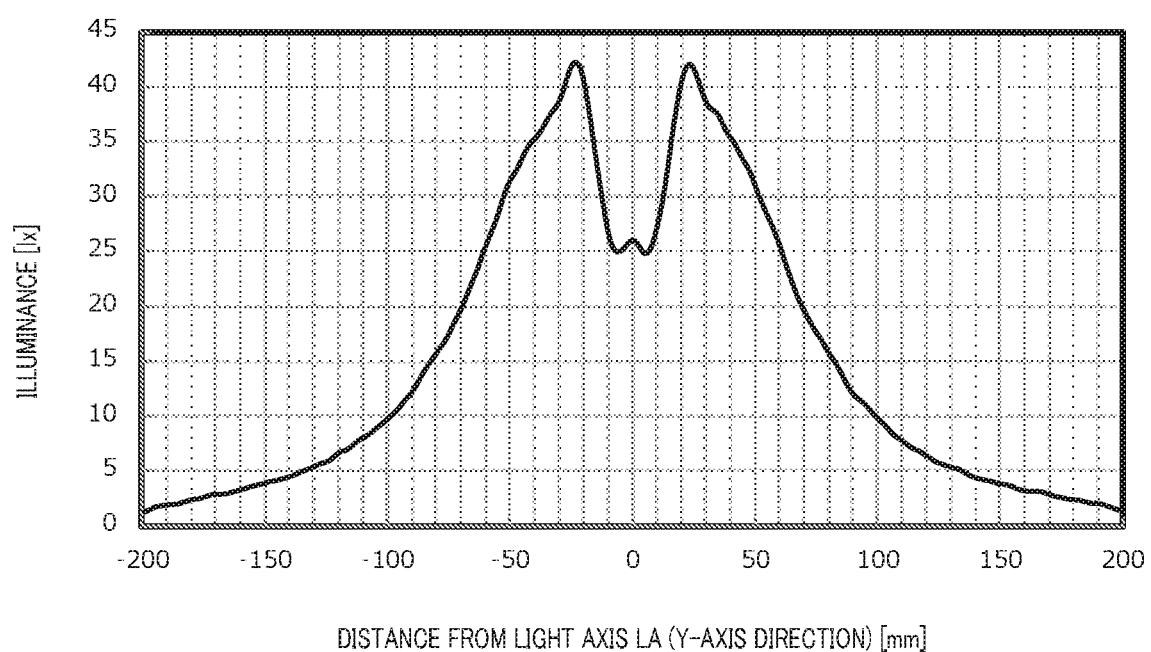
FIG. 12 illustrates analysis results of illuminance distributions on a light diffusion plate in a surface light source device provided with the comparative light flux controlling member.
Figure 13:
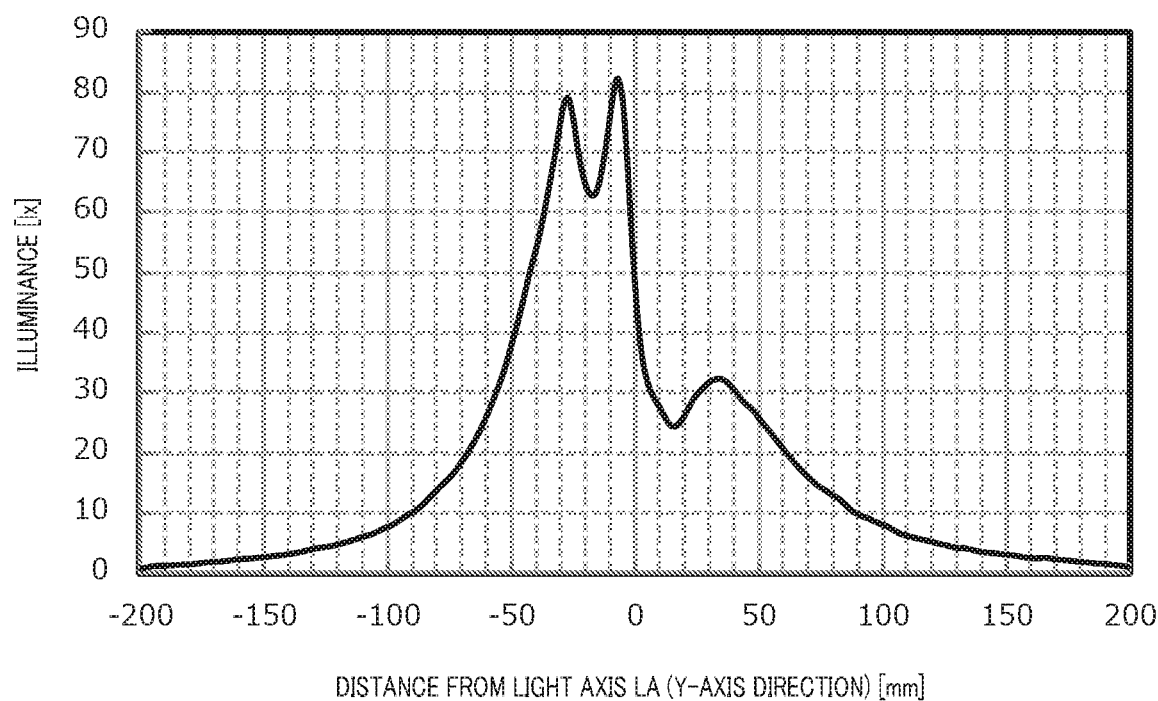
FIG. 13 illustrates analysis results of illuminance distributions on a light diffusion plate in a surface light source device provided with the light flux controlling member according to the embodiment.

FIG. 12 illustrates analysis results of illuminance distributions on light diffusion plate 150 in a surface light source device provided with the comparative light flux controlling member. FIG. 13 illustrates analysis results of illuminance distributions on light diffusion plate 150 in surface light source device 100 provided with the light flux controlling member according to the present embodiment.

In FIG. 12 and FIG. 13, the abscissa indicates a distance (distance in the Y-axis direction, mm) from light axis LA of light-emitting element 131 at light diffusion plate 150, and the ordinate indicates illuminance on light diffusion plate 150.

As illustrated in FIG. 10A, in the surface light source device provided with the comparative light flux controlling member, a large part of the non-axial light beams emitted from a point in light-emitting element 131 in the positive side with respect to the light emission center in the Y-axis direction is entered from incidence surface 21 on the negative side in the Y-axis direction, and is reflected by reflection surface 22 on the negative side in the Y-axis direction so as to be expanded to the negative side in the Y-axis direction.

Likewise, as illustrated in FIG. 10B, a large part of the non-axial light beams emitted from a point in light-emitting element 131 on the negative side in the Y-axis direction with respect to the light emission center is entered from incidence surface 21 on the positive side in the Y-axis direction, and is reflected by reflection surface 22 on the positive side in the Y-axis direction so as to be expanded to the positive side in the Y-axis direction. That is, the light paths illustrated in FIG. 10A and the light paths illustrated in FIG. 10B are symmetric, and when the light paths illustrated in FIG. 10A and the light paths illustrated in FIG. 10B are combined with each other, the quantity of the light expanded to the negative side in the Y-axis direction, and the quantity of the light expanded to the positive side in the Y-axis direction are identical to each other.

Also, as illustrated in FIG. 10C, the axial light emitted from the light emission center of light-emitting element 131 expands symmetrically with respect to light axis LA, and the quantity of the light expanded to the negative side in the Y-axis direction, and the quantity of the light expanded to the positive side in the Y-axis direction are identical to each other.

In contrast, as illustrated in FIG. 11A, in light surface light source device 100 provided with flux controlling member 132 according to the present embodiment, a large part of the non-axial light beams emitted from a point in light-emitting element 131 in the positive side with respect to the light emission center in the Y-axis direction is entered from first incidence surface 133 and third incidence surface 135, and is reflected by first reflection surface 137 so as to be expanded to the negative side in the Y-axis direction.

On the other hand, as illustrated in FIG. 11B, a part of the non-axial light emitted from a point in light-emitting element 131 on the negative side of the light emission center in the Y-axis direction is entered from second incidence surface 134, and is reflected by second reflection surface 138 so as to be expanded to the positive side in the Y-axis direction; while the remaining part of the light is entered from first incidence surface 133, and is reflected by third incidence surface 135, and is then, reflected by first reflection surface 137 so as to be expanded to the negative side in the Y-axis direction. That is, the light paths illustrated in FIG. 11A and the light paths illustrated in FIG. 11B are asymmetric, and when the light paths illustrated in FIG. 11A and the light paths illustrated in FIG. 11B are combined with each other, the light quantity of the light expanded to the negative side in the Y-axis direction is greater than the light quantity of the light expanded to the positive side in the Y-axis direction.

Further, as illustrated in FIG. 11C, the light that is emitted from the light emission center of light-emitting element 131 and is entered from first incidence surface 133 and third incidence surface 135 less travels toward rear surface 140 but expands more in the Y-axis direction, that is, the light is expanded more to the negative side than to the positive side in the Y-axis direction in comparison with the light that is emitted from the light emission center of light-emitting element 131 and is entered from second incidence surface 134.

As described above, in comparison with the surface light source device provided with the comparative light flux controlling member, surface light source device 100 provided with the light flux controlling member according to the present embodiment can expand the light more to the negative side (the left side in FIG. 10 and FIG. 11) in the Y-axis direction than to the positive side (the right side in FIG. 10 and FIG. 11) in the Y-axis direction, and thus can expand the light asymmetrically with respect to light axis LA.

In addition, as illustrated in FIG. 12, in the surface light source device provided with the comparative light flux controlling member, the illuminance distribution is symmetric with respect to light axis LA. In contrast, as illustrated in FIG. 13, in surface light source device 100 provided with the light flux controlling member according to the present embodiment, the illuminance on the negative side in the Y-axis direction is higher than on the positive side in the Y-axis direction, and thus the illuminance distribution is asymmetric with respect to light axis LA.

Effect

As described above, flux controlling member 132 according to the present embodiment includes light first incidence surface 133 and third incidence surface 135. With such a configuration, non-axial light beams that are emitted from light-emitting element 131, in particular from a point on the side to which light to be expanded, toward the side to which the light should not be expanded are entered from first incidence surface 133 and are reflected by third incidence surface 135, thus delivering the light beams in the direction to which the light beams should be expanded (comparison between FIGS. 10B and 11B). In this manner, in the Y-axis direction, the light can be expanded more to one side than to the other side with respect to light axis LA, and light can be expanded asymmetrically with respect to light axis LA.

As a result, by disposing light flux controlling member 132 according to the present embodiment such that first incidence surface 133 is closer to long side 150a of light diffusion plate 150 than second incidence surface 134 (see FIG. 3A and FIG. 4A), light can be delivered to the corners of surface light source device 100 even in the case where the line of light-emitting devices 130 is disposed at a position shifted from the center of bottom plate 111.

While housing 110 is a box with bottom plate 111a and two inclined surfaces 111b disposed with bottom plate 111a therebetween in the present embodiment, the present invention is not limited to this. Housing 110 may be a cuboid box with a bottom plate, a top plate disposed opposite the bottom plate, and four side plates connecting the bottom plate and the top plate. In this case, to readily collect light emitted from light-emitting element 131 at light diffusion plate 150, a reflection plate having an inclined surface may be disposed inside the cuboid box.

While light-emitting devices 130 are disposed in a line in surface light source device 100 in the present embodiment, the present invention is not limited to this, and light-emitting devices 130 may be disposed in two or more lines.

While light flux controlling member 132 does not include a leg part in the present embodiment, the present invention is not limited to this, and a leg part may be provided. To be more specific, light flux controlling member 132 may include a plurality of leg parts each having a substantially columnar shape protruding to the rear side from rear surface 140 at an outer periphery part on rear surface 140.

While light flux controlling member 132 includes two fourth incidence surfaces 136 in the present embodiment, the present invention is not limited to this. For example, fourth incidence surface 136 may not be provided in the case where light flux controlling member 132 includes a plurality of leg parts at the outer periphery part on rear surface 140.

This application is entitled to and claims the benefit of Japanese Patent Application No. 2017-054625 filed on Mar. 21, 2017, the disclosure each of which including the specification, drawings and abstract is incorporated herein by reference in its entirety.

INDUSTRIAL APPLICABILITY

The surface light source device including the light flux controlling member according to the embodiments of the present invention is applicable to a backlight of a liquid crystal display, a sign board, a generally-used illumination apparatus and the like, for example.

REFERENCE SIGNS LIST

100 Surface light source device
110 Housing
111 Bottom plate
111a Horizontal part
111b Inclined part
111c Inclined part
112 Top plate
120 Substrate
130 Light-emitting device
131 Light-emitting element
132 Light flux controlling member
133 First incidence surface
134 Second incidence surface
135 Third incidence surface
136 Fourth incidence surface
137 First reflection surface
138 Second reflection surface
139 Emission surface
140 Rear surface
141 Recess
150 Light diffusion plate
150a, 150b Long side
CA Central axis
LA Light axis

What is claimed is:

1. A light flux controlling member configured to control a distribution of light emitted from a light-emitting element, the light flux controlling member comprising:
a rear surface that is parallel to an XY plane and extends in a Y-axis direction in XYZ coordinates including an X axis, a Y axis and a Z axis orthogonal to each other;
a first incidence surface that is a part of an inner surface of a recess disposed on a side of the rear surface, the first incidence surface being configured to allow incidence of a part of the light emitted from the light-emitting element;
a second incidence surface that is another part of the inner surface of the recess, the second incidence surface being configured to allow incidence of another part of the light emitted from the light-emitting element;
a third incidence surface disposed between the first incidence surface and the second incidence surface, the third incidence surface being configured to allow incidence of still another part of the light emitted from the light-emitting element while reflecting light entered from the first incidence surface;
a first reflection surface disposed on a front side that is opposite to the rear surface in a Z-axis direction, the first reflection surface being configured to reflect, to a first side in the Y-axis direction, the light entered from the first incidence surface, light that is entered from the first incidence surface and is reflected by the third incidence surface, and light that is entered from the third incidence surface;
a second reflection surface disposed on the front side, the second reflection surface being configured to reflect light entered from the second incidence surface to a second side in the Y-axis direction, the second side being opposite to the first side; and
two emission surfaces disposed opposite each other with the first reflection surface and the second reflection surface between the two emission surfaces, the two emission surfaces being configured to emit, to outside, light reflected by the first reflection surface or the second reflection surface;
wherein the third incidence surface is disposed on an XZ plane in the XYZ coordinates; and
wherein the first incidence surface is substantially parallel to the XY plane in the XYZ coordinates.

2. The light flux controlling member according to claim 1, wherein a maximum depth of the recess corresponding to the first incidence surface is 0.1 to 0.5 times a maximum depth of the recess corresponding to the second incidence surface.

3. A light-emitting device, comprising:
a light-emitting element whose light axis is disposed parallel to the Z axis; and
the light flux controlling member according to claim 1, wherein the first incidence surface and the second incidence surface are disposed opposite the light-emitting element.

4. A surface light source device, comprising:

a plurality of the light-emitting devices according to claim 3; and a light diffusion plate configured to allow light emitted from the plurality of the light-emitting devices to pass through the light diffusion plate while diffusing the light.

5. The surface light source device according to claim 4, wherein the plurality of light-emitting devices are disposed in a line along the X axis;

wherein the line of the plurality of light-emitting devices is parallel to a pair of opposite sides of the light diffusion plate;

wherein, in plan view of the surface light source device, a distance between the line of the plurality of light-emitting devices and one side of the pair of opposite sides of the light diffusion plate is greater than a distance between the line of the plurality of light-emitting devices and another side of the pair of opposite sides of the light diffusion plate; and wherein each of the plurality of light-emitting devices is disposed such that the first incidence surface of the light flux controlling member is closer to the one side of the pair of opposite sides of the light diffusion plate than the second incidence surface.

* * * * *